A. WILLIAMS.
Countersink.
No. 52,776.
Patented Feb. 20, 1866.
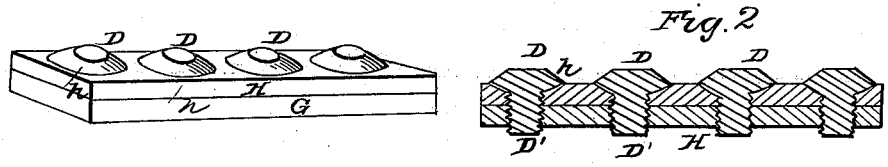
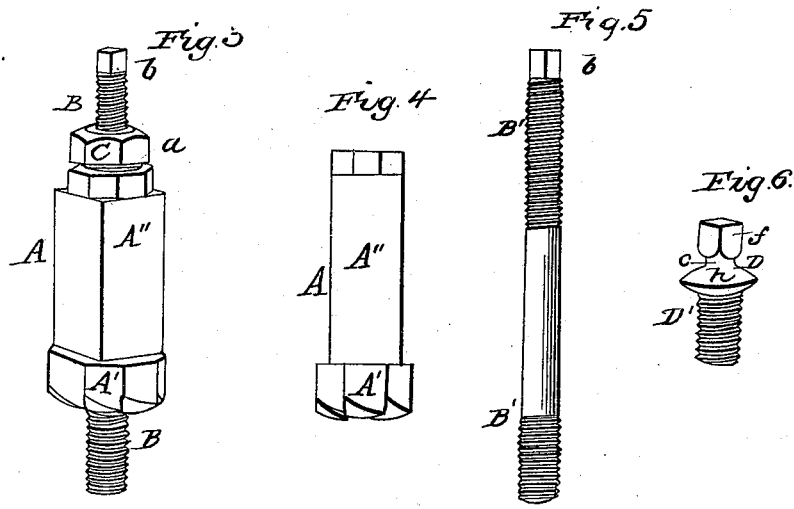
WITNESSES
INVENTOR

UNITED STATES PATENT OFFICE.

A. WILLIAMS, OF WELLSVILLE, OHIO.

IMPROVED COUNTERSINK.

Specification forming part of Letters Patent No. 52,776, dated February 20, 1866.

*To all whom it may concern:*

Be it known that I, A. WILLIAMS, of Wellsville, in the county of Columbiana and State of Ohio, have invented certain new and useful Improvements in Countersinks; and I do hereby declare that the following is a full and complete description of the construction and operation of the same, reference being had to the accompanying drawings, making a part of this specification, in which—

Figure 1 is a section of a boiler patched. Fig. 2 is a longitudinal section of the same, showing the work done by the countersink. Fig. 3 is a perspective view of the countersink. Figs. 4 and 5 are detached sections of the same. Fig. 6 represents the bolt.

My improvement relates to the construction and operation of a countersink used in patching boilers, as hereinafter described.

Fig. 1 represents the section of a boiler patched by the use of a countersink (shown in Fig. 3) that consists of a burr, A, of which A' is the burr-head and A'' the shank of the burr. Through the burr extends a stem, B, (seen in Fig. 5,) that is formed into screws B' B'' at each end, as represented. The end B' terminates in a square head, b, for the purpose of screwing it into the boiler-plate.

C is a bolt-head on the screw-between which and the burr there is a washer, a.

The manner in which the countersink as constructed is used in patching boilers is as follows: G, Fig. 1, represents a section of the boiler-plate, and H the patch, both of which are tapped in the ordinary manner, when the screw B'' is inserted or screwed into the hole. Then the burr A, if not already on the stem B, is put on it from the end B', so that the head A' of the burr will come up against the patch, when the nut C, with the washer, will be screwed down upon the end of the burr. The burr will then be turned by means of a wrench or otherwise, when the burr-head will cut out the metal, and as it is turned in this manner the nut C is turned so as to screw against the end of the burr, forcing the burr-head gradually into the plate until it is countersunk out the desired depth, or so as to correspond with the shape and size of the under part of the head h of the bolt D, as represented in Fig. 6. The burr and screw or countersink is then withdrawn from the hole and the bolt D inserted in its place or screwed into the opening, as shown in Figs. 1 and 2.

The screw B'' of the countersink must correspond in size and form with the screw D' of the bolt, and the countersunk space also with the head h, as before stated, so that the bolt will screw tightly into the hole and the head fit down closely into the countersunk space, as seen in Fig. 2. When the bolt is thus secured in place the square head f is twisted off at the shoulder c, where it is quite small across, and the bolt-head on the outside is in the form shown in Fig. 1, securing the patch as firmly on the boiler as it could be done in any other way.

It is well known what difficulties arise from patching boilers, because it is often so difficult to gain access to the inside; but by means of this countersink the work can be done as well and better entirely from the outside, as herein described, the advantages of which are evident.

There can be different-sized screws used, according to the size of the bolt with the same burr.

The holes tapped in the boiler and screws on the stem and bolt must all correspond, whether larger or smaller.

What I claim as my improvement, and desire to secure by Letters Patent, is—

The burr A, stem B, provided with a screw at each end, in combination with the nut C, arranged and operating conjointly, as and for the purpose set forth.

A. WILLIAMS.

Witnesses:
W. H. BURRIDGE,
A. W. McCLELLAND.